UNITED STATES PATENT OFFICE.

HERMANN SCHIMMEL, OF CHARLOTTENBURG, GERMANY, ASSIGNOR, BY MESNE ASSIGNMENTS, TO GERMANTOWN REAL ESTATE, DEPOSIT AND TRUST COMPANY, TRUSTEE, OF PHILADELPHIA, PENNSYLVANIA, A CORPORATION OF PENNSYLVANIA.

PROCESS OF MAKING SELF-IGNITERS FOR GAS.

No. 825,765.     Specification of Letters Patent.     Patented July 10, 1906.

Application filed December 28, 1897. Serial No. 664,109.

*To all whom it may concern:*

Be it known that I, HERMANN SCHIMMEL, of Charlottenburg, Germany, have invented certain new and useful Improvements in Processes of Making Self-Igniters for Gas, of which the following is a specification.

This invention relates to improvements in self-igniters for gas-burners of the sort in which use is made of a block or small body of porous material having in its pores platinum in a finely-divided form—as, for instance, what is known as "platinum-black."

In the art as heretofore practiced use has been made for this purpose of such substances as meerschaum; but it has been found that when porous material of that sort is used in its natural formation and with its natural consistency a serious disadvantage is experienced in this, that the porosity is not uniform through any given natural mass, nor is it the same in different pieces, and this lack of uniformity exists not only with respect to distribution of the pores, but also with respect to their form and size.

In order to avoid the disadvantages incident to porous bodies in their natural state when used for self-igniters, I make artificially the cores, employing for this purpose pulverized or finely-reduced substances which are intimately and uniformly mixed with the refractory material, the non-refractory substances being such as can be withdrawn during the time when the core is being hardened or afterward and adapted to leave pores at the places where their particles were situated prior to such withdrawal and deposit in the pores so artificially formed a finely-reduced platinum, as platinum-black. The latter substance, as is well known, has the quality of causing the igniter to grow hot by its action in streams of gas of certain sorts.

The raw material for the manufacture of the core may be made of any pulverized refractory substance which has the property of forming a coherent body after being subjected to heat or to other suitable treatment. The pore-making substance may be of any material which is capable of being mixed with the core substance, it being uniformly distributed therethrough and subsequently withdrawn without destroying the constitution or the structure of the core material. The pore-making substance can be withdrawn or eliminated by either of several methods. It may be burned out or subjected to high heat in such way as to convert it into gas, or if it be of the proper character it may be washed out after the core is hardened or converted into a soluble body and dissolved—that is, dissolved either in its initial condition or after converting it into a soluble body.

When following the first plan of carrying out my invention, I take a mass of pulverized clay or of pulverized silicates and intimately mix therewith combustible organic substances, such as charcoal, sawdust, and the like. After the masses have been mixed and have been formed into desired shape they are subjected to a suitable temperature (preferably that employed in making bisque ware) whereby the mass is sufficiently hardened and caused to become porous to the desired degree, the organic substances being eliminated through combustion. When following the second plan of carrying out the invention, I mix with the mass of core material a suitable substance, such as an oxid of a metal, as, for instance, the oxid of aluminium or salt of an alkali, (for example, the chlorid of natrium,) or any other substance that can be withdrawn or eliminated by a solvent which is inert or substantially inert in relation to the core mass. For example, I intimately mix clay with the pulverized oxid of aluminium. After having subjected the mixture to a suitable high temperature I subject it to the action of hydrochloric acid. This acid will convert the oxid of aluminium into chlorid of aluminium, which can be washed out by treating the mass with water. In this way the pore-making substance can be completely removed and empty pores will be left uniformly distributed through the mass of the core for the absorption of the finely-reduced platinum, or, again, both plans of producing cores of this sort can be followed in treating the same articles. For instance, I sometimes mix clay with pulverized charcoal and pulverized oxid of aluminium. I then subject the mixture or compound to a heat sufficiently high for burning it, and pores of two sorts are produced—namely, empty pores, which can be regarded as primary pores, corresponding to the burned-out particles of charcoal, and, secondly, pores, which may be regarded as secondary pores, still filled with oxid of aluminium. This oxid is afterward washed out in the manner above described, or yet, again, without departing from the invention I can proceed in the following manner. After subjecting the mass of refractory material, charcoal, and oxid of aluminium or their equivalent to the burning treatment and before eliminating or withdrawing the oxid of aluminium I impregnate the body with a solution of a salt of platinum—say, for instance, chlorid of platinum. This platinum solution will fill the empty pores, or the pores of the first order, (previously occupied by the organic particles,) while the oxid of aluminium in the pores of the second order will be converted into chlorid of platinum aluminium. When the body is now placed in a stream of hydrogen or carbureted hydrogen gas, the chlorid of platinum in the pores of the first order is reduced to platinum-black, while in the pores of the second order, besides platinum-black, chlorid of aluminium is deposited, which can be readily withdrawn by a washing process.

When the igniting-pellet is formed as herein described, no hygroscopic materials are left therein. A pellet of clay thoroughly freed from moisture after the pores have been formed by the removal of the oxid of aluminium or similar material contains nothing which will provide a hygroscopic salt, and after it has been fully charged with the platinum-black there is nothing present for the absorbing or holding of moisture. An igniting-body of this material is readily distinguishable from one formed by charging a natural body which is more or less porous naturally or a natural body which is artificially made porous, in that in the present case the pores and the pore-walls are uniformly distributed throughout the entire mass, in contradistinction from having areas of less porosity and areas of greater porosity, and consequently these pellets can be relied upon at all times for a continual igniting efficiency, and the fact that the igniting efficiency has not continued uniform has been the principal thing which has rendered the earlier igniters unserviceable.

Another important advantage incident to my improved method of manufacturing self-igniting cores is that it permits the connecting or attaching of the igniting-wires with the igniting-body more intimately than they can be when following any of the plans of manufacture heretofore proposed. When joined by any other method with which I am acquainted, there was not such an intimacy or closeness of union of the parts as to insure sufficient transmission of heat to the igniting-wires, and the latter could not under all circumstances become incandescent and light the gas.

When following the present method of manufacture, the wires (preferably platinum or a metal of the platinum group) are inserted into the body of the material above described while still plastic and prior to subjecting it to the burning heat, and during the burning operation, which occurs subsequently, the material contracts around the wire, and a union or connection is attained which, as above stated, is exceedingly intimate, and consequently the heat necessary for properly heating the wire is readily conducted thereto and the igniting of the gas thereby insured and accelerated.

I claim—

1. The herein-described process of making self-lighting bodies for gas which consists in providing a plastic mass containing pulverized refractory core material, and a pulverized material intermingled with the core material and uniformly distributed therethrough, subsequently baking the combined mass, then dissolving out the pore-forming material, then causing the deposit of platinum-black in the pores of the mass, substantially as set forth.

2. The herein-described method of forming a self-igniter for gas, it consisting in first making a plastic homogeneous mass containing a mass of refractory earth adapted to be baked or burned into a coherent body and a mass of pore-forming material capable of being washed out, then baking the said plastic mass until the core becomes hardened into a coherent body, then washing out the pore-forming particles and then causing platinum-black to be deposited in the pores of the mass, substantially as set forth.

3. The herein-described process of making a self-igniter for gas which consists in forming a homogeneous mixture containing reduced refractory core material and reduced pore-forming material intermingled with the refractory material and adapted to be withdrawn therefrom to leave pores in the resulting body, then subjecting the mixture to a high heat, then withdrawing the reduced particles of pore-forming material and then causing platinum black to be deposited in the pores produced as aforesaid, substantially as set forth.

4. The herein-described process of making self-lighting bodies for gas which consists in making a plastic mass containing pulverized refractory core material, and a pulverized pore-forming material homogeneously intermingled with the core material, forming the said mixture into the proper-sized bodies, inserting platinum wires into the said plastic bodies, burning the plastic material and causing the said platinum wires to be firmly fastened in the body by the contraction of its material, removing the pore-forming material, and then depositing platinum-black in the pores, substantially as set forth.

In testimony whereof I have signed my name to this specification in the presence of two subscribing witnesses.

HERMANN SCHIMMEL.

Witnesses:
CHARLES H. DAY,
HENRY HASPER.